Dec. 30, 1952     R. S. CUTLAN ET AL     2,623,603
LAWN MOWER POWER UNIT
Filed Feb. 19, 1948
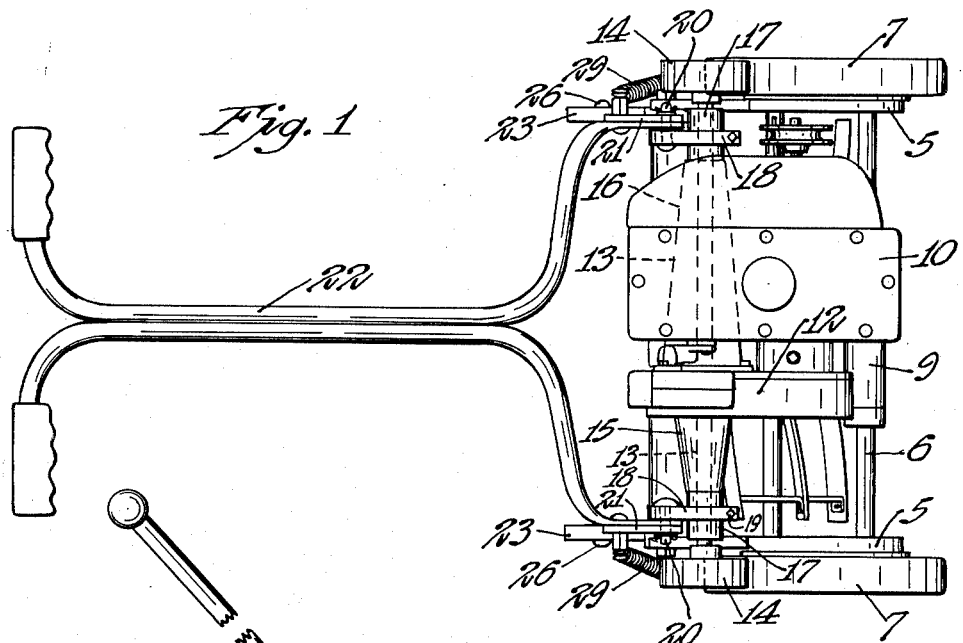
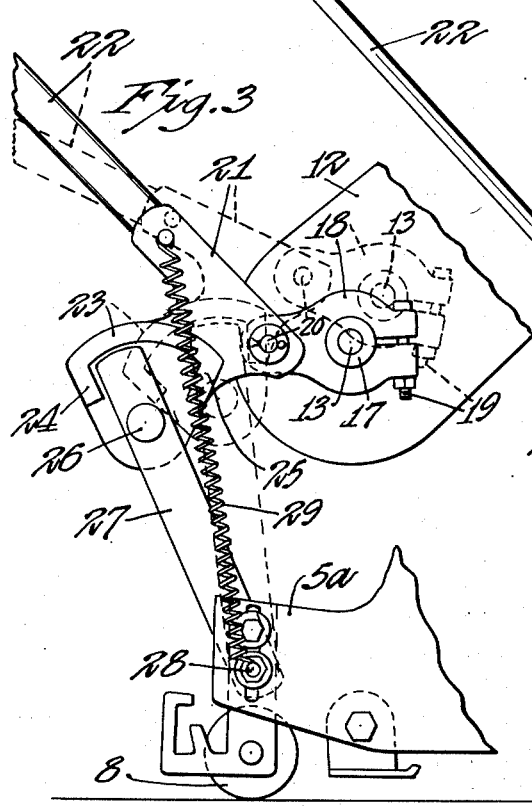
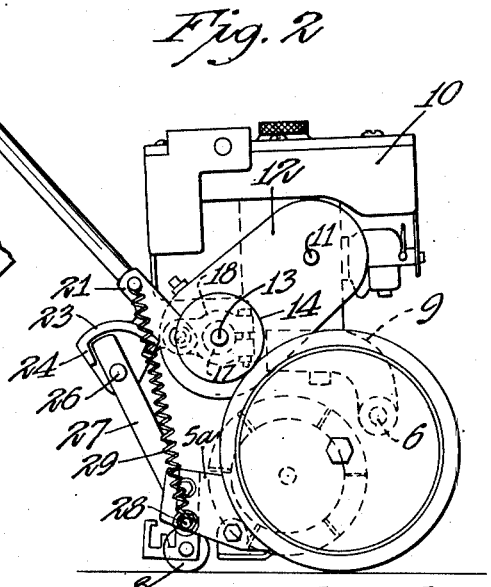
Inventor
Roland S. Cutlan
Edmund J. Glenn
By Williamson & Williamson
Attorneys Patented Dec. 30, 1952

2,623,603

UNITED STATES PATENT OFFICE 2,623,603

LAWN MOWER POWER UNIT

Roland S. Cutlan, Robbinsdale, and Edmund J. Glenn, Minneapolis, Minn.

Application February 19, 1948, Serial No. 9,594

5 Claims. (Cl. 180—19)

This invention relates to power lawn mowers and more particularly to that type of mower wherein a small power unit is associated with a conventional rotary reel mower construction.

It is an object of the invention to provide a power lawn mower construction wherein the power unit is provided with a drive roller engageable with one of the ground wheels and wherein the mower handle is so associated with the power unit and mower frame that shifting of the handle will engage and disengage the drive roller and ground wheel and yieldably retain it in either position.

Another object of the invention is to provide a power unit of the type described above, which can be readily mounted upon a mower with a minimum of change of the conventional mower parts.

The above and other objects and advantages of the invention will more fully appear from the following description made in connection with the accompanying drawing wherein like reference characters refer to the same parts throughout the views, and in which:

Figure 1 is a plan view of the device;

Figure 2 is a side elevational view; and

Figure 3 is an enlarged fragmentary side elevational view of the pivoted linkage and spring assembly showing alternate positions thereof in full and dotted lines.

The present invention is an improvement upon certain features of the structure shown in our co-pending application, Serial Number 692,034, filed August 21, 1946, now abandoned, by Roland S. Cutlan and Edmund J. Gliniany, and entitled "Power Attachment for Lawn Mowers," the party Gliniany, having since had his name changed by judicial decree to Glenn.

In common with the above identified application, the present disclosure shows lawn mower side frame members 5 connected by a cross bar 6 and supported by ground wheels 7. As shown in Figures 2 and 3, the frame members 5 have rearward extensions 5a supported by a ground roller 8.

Extending upwardly and rearwardly from the frame cross bar 6 is a bracket 9 upon which is mounted a small internal combustion engine 10. A power shaft 11 extends from the engine 10 into a gear housing 12 which has a drive roller shaft 13 extending therefrom in both directions and across the width of the mower frame. On each end of the drive roller shaft 13 is a drive roller 14 which is adapted to contact its respective ground wheel 7. The lower portion of the gear casing 12 is preferably provided with differential gear mechanism such as disclosed in the above identified application to facilitate handling of the mower when making turns. The shaft 13 is shown in Figure 1 to be enclosed in housings 15 and 16.

The outer end of each of the housings 16 is provided with a reduced cylindrical portion 17. On each of these is a split clamp 18 shown in Figures 2 and 3, and tightened by a nutted bolt 19. Each clamp 18 is connected by a pivot pin 20 to a plate 21 suitably secured to the forked lower end portions of a lawn mower handle 22, the plates 21 being rigid relative to the handle.

Formed integrally with the plates 21 are stop units 23 having stop abutments 24 and 25 thereon. A pivot pin 26 extends through the stop element 23 at each side of the assembly and connects with a link 27 somewhat below the end of the link so that as the link swings relative to the stop unit 23 its extreme upper end will swing between the abutments 24 and 25. The bottom end of each link 27 is pivotally mounted on a nutted bolt 28 on the rear frame extension 5a.

Extending between the lower portion of the handle 22, approximately at the upper portion of each of the plates 21, and the nutted bolt 28, is a tension spring 29.

The engine supporting bracket 9 is swingable about the mower frame cross bar 6. When the handle 22 is raised it will lower the engine 10 and drive rollers 14 so that said rollers will engage the ground wheels 7. This will place the mechanism in the full line position of Figure 3. When disengagement of the drive is desired the handle 22 is lowered at its outer end. This will cause the plate 21 and its abutment plate 23 and the lower end of the handle 22 to swing counter-clockwise about the axis of the pivot pin 26. In turn this will raise the roller drive shaft 13 and disengage the rollers 14 from the ground wheels. As this movement takes place the center of the pivot pin 26 will shift from the left hand side to the right hand side of the spring 29. Consequently, the spring acts with an overcenter pull in either position of the handle, engine and drive rollers to yieldably maintain said rollers in or out of engagement with the ground wheels 7.

It will, of course, be understood that various changes may be made in the form, details, arrangement and proportions of the various parts without departing from the scope of my invention.

What we claim is:

1. In a power lawn mower, a frame, a prime mover power unit mounted on said frame for movement relative thereto, a ground wheel on said frame, a rotary drive member carried by said power unit and shiftable therewith into registering and non-registering positions with said ground wheel to permit said drive member to engage and disengage said ground wheel, a handle having a pivotal connection with said power unit and swingable upwardly and downwardly relative to said power unit and about said pivotal connection, and a link pivotally connected between a lower portion of said frame and said handle, said link constituting a fulcrum for said handle whereby said drive member will be caused to engage and disengage said ground wheel when said handle is moved upwardly and downwardly.

2. In a power lawn mower, a frame, a prime mover power unit mounted on said frame for movement relative thereto, a ground wheel on said frame, a rotary drive member carried by said power unit and shiftable therewith relative to said frame and said ground wheel to permit said drive member to engage and disengage said ground wheel, a handle pivotally connected to said power unit, a rigid link pivotally connected between a lower portion of said frame and said handle, and constituting a fulcrum for said handle whereby said drive member will be caused to disengage said ground wheel when said handle is swung downwardly, said link having stop means associated therewith and constituting in conjunction therewith means for limiting movement of said power unit and handle relative to said frame.

3. In a power lawn mower, a frame, a prime mover pivotally mounted on said frame for free movement relative thereto, a ground wheel on said frame, a rotary drive member carried by said prime mover and shiftable therewith relative to said frame and said ground wheel from non-registering position to registering position with respect to said ground wheel and vice versa to permit said drive member to engage and disengage said ground wheel, a handle pivotally connected to said prime mover, a link pivotally connected between a lower portion of said frame and said handle, said link constituting a fulcrum for said handle whereby said drive member will be caused to engage and disengage said ground wheel when said handle is moved to its pivotal extremes, and a spring device connection between said handle and a portion of said frame and normally urging said prime mover and handle to a position with said rotary drive member in engagement with said ground wheel.

4. In a power lawn mower, a frame, a power unit mounted on said frame for movement relative thereto, a ground wheel on said frame, a rotary drive member carried by said power unit and shiftable therewith relative to said frame and said ground wheel to permit said drive member to engage and disengage said ground wheel, a handle pivotally connected to said power unit, a link having another pivotal connection between a portion of said frame and said handle at a point spaced from the pivotal connection between said handle and said power unit to provide a fulcrum for said handle whereby said rotary drive member will be caused to engage and disengage said ground wheel when said handle is moved pivotally, and a tension spring connected between said frame and said handle and said another pivotal connection lying between the ends of said spring and being shiftable to either side of said spring upon pivotal movement of said handle.

5. In a power lawn mower, a frame, wheels supporting said frame, said frame having spaced side portions and a brace connecting them, a power unit pivotally mounted on said brace for limited swinging movement thereabout, said power unit including a rotary drive member movable with the power unit and into and out of driving engagement with one of said wheels, and upwardly extending mower steering handle connected at its lower end with said power unit on a horizontally axial pivot and having its upper end freely swingable upwardly and downwardly, and a fulcrum link pivotally connected between said frame and said handle, the handle connection being located between the pivotal connection of said handle and power unit and the opposite end of said handle whereby upward and downward movement of said handle will engage and disengage the driving engagement between said power unit and said wheel.

ROLAND S. CUTLAN.
EDMUND J. GLENN.

REFERENCES CITED

The following references are of record in the file of this patent:

UNITED STATES PATENTS

| Number | Name | Date |
|---|---|---|
| 1,124,162 | Monahan | Jan. 5, 1915 |
| 1,819,791 | Reed | Aug. 18, 1931 |
| 1,866,380 | Wagner | July 5, 1932 |
| 2,151,659 | Funk | Mar. 21, 1939 |
| 2,247,333 | Funk | June 24, 1941 |
| 2,256,531 | Squires | Sept. 23, 1941 |
| 2,433,709 | Rogers | Dec. 20, 1947 |